(12) United States Patent
Wheelwright

(10) Patent No.: US 9,210,969 B2
(45) Date of Patent: Dec. 15, 2015

(54) FASTENER AND FASTENER SYSTEM

(71) Applicant: Troy Wheelwright, Amesbury, MA (US)

(72) Inventor: Troy Wheelwright, Amesbury, MA (US)

( * ) Notice: Subject to any disclaimer, the term of this patent is extended or adjusted under 35 U.S.C. 154(b) by 232 days.

(21) Appl. No.: 13/862,622

(22) Filed: Apr. 15, 2013

(65) Prior Publication Data

US 2013/0312227 A1  Nov. 28, 2013

Related U.S. Application Data

(60) Provisional application No. 61/665,391, filed on Jun. 28, 2012, provisional application No. 61/624,536, filed on Apr. 16, 2012.

(51) Int. Cl.
*A44B 11/25* (2006.01)
*B65D 63/10* (2006.01)

(52) U.S. Cl.
CPC ........ *A44B 11/2592* (2013.01); *B65D 63/1027* (2013.01); *B65D 2563/107* (2013.01); *B65D 2563/108* (2013.01); *Y02W 30/807* (2015.05); *Y10T 24/1498* (2015.01); *Y10T 24/3413* (2015.01)

(58) Field of Classification Search
None
See application file for complete search history.

(56) References Cited

U.S. PATENT DOCUMENTS

| | | | | |
|---|---|---|---|---|
| 5,377,388 | A | * | 1/1995 | DeBever ...................... 24/16 PB |
| 6,684,466 | B2 | | 2/2004 | Nishida et al. |
| 2002/0104196 | A1 | * | 8/2002 | Geiger ......................... 24/16 PB |
| 2008/0250609 | A1 | | 10/2008 | Framks |

* cited by examiner

*Primary Examiner* — Jack W Lavinder

(57) ABSTRACT

A reusable connecting device that includes a strap with a first end a second end, wherein the strap features teeth located on one of the ends. The reusable tie wrap includes a housing with an opening, which is configured to engage with the teeth of the strap. An attachment mechanism is located on the tie wrap, which is configured to allow for connection, disconnection and reconnection with an attachment mechanism of another device. The attachment mechanism may be a two part buckle enclosure or side-release buckle. In another embodiment, the reusable connecting device may also be coupled to an adjustable connecting device. The adjustable connecting device is configured to be secured to an object with which the reusable connecting device is to be utilized.

4 Claims, 10 Drawing Sheets

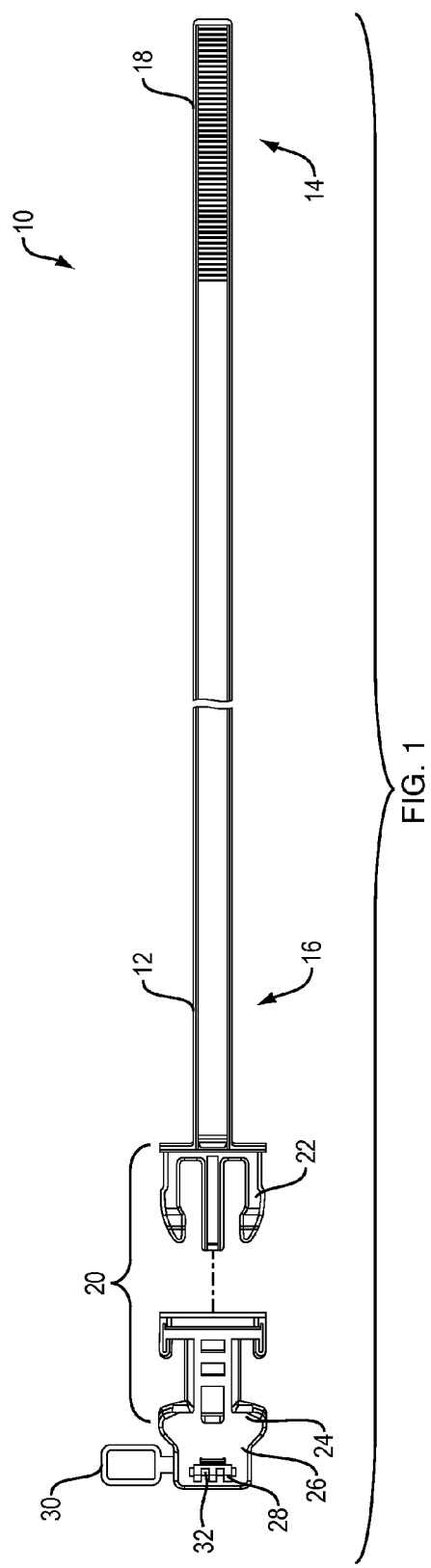

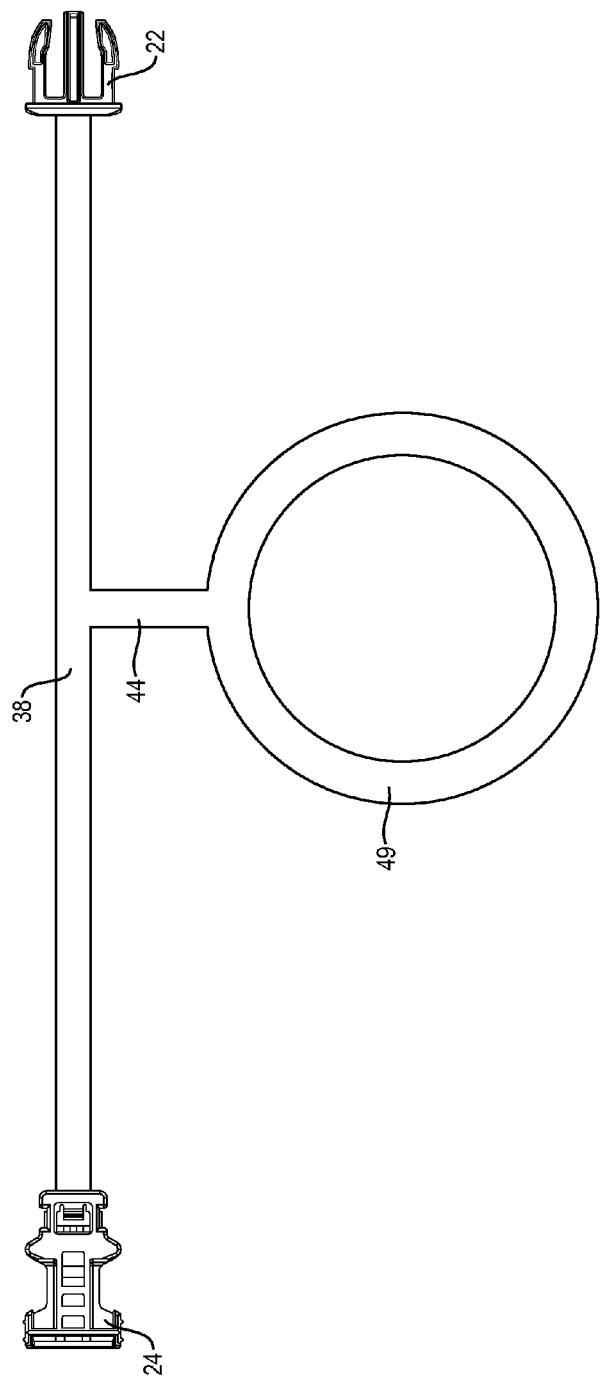
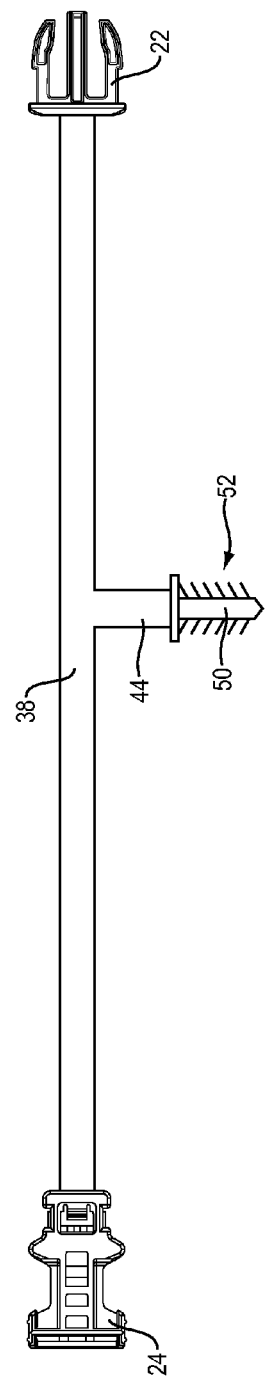

FASTENER AND FASTENER SYSTEM

CROSS-REFERENCE TO RELATED APPLICATIONS

This application claims the benefit of U.S. Provisional Application Ser. No. 61/624,536 entitled "FASTENER AND FASTENER SYSTEM" filed Apr. 16, 2012 and U.S. Provisional Application Ser. No. 61/665,391 entitled "FASTENER AND FASTENER SYSTEM" filed on Jun. 28, 2012, both of which are incorporated fully herein by reference.

TECHNICAL FIELD

The present invention relates to a reusable connection device and more particularly, relates to a wrap tie that can be adjusted to a particular size and connected, disconnected and reconnected.

BACKGROUND INFORMATION

Tie wraps, also known as cable ties, typically include a strap with a length, wherein the strap includes a first end with a plurality of "teeth" and a second end that has an opening, whereby the first end of the strap is configured to pass through the opening of the second end. Typically, the first end cannot be removed from the opening, once the teeth engage with an inner surface of the opening. The tie wraps allow a user to tighten, but not loosen, the sizing of the enclosure created by placement of the first end into the opening of the second end. Most tie wraps are therefore essentially a one-time use fastener, because the first end cannot be released from the second end once it passes through the opening and the teeth engage with the notches in the opening. The sizing of the enclosure can be made smaller, however, by continuing to pull the first end further through the opening of the second end. Once a user wants to remove the tie wrap, they cut the tie wrap and dispose of the tie wrap.

The majority of the current design of tie wraps ensures that they are one-time use. There have been some attempts at designing a releasable/reusable tie wrap, although these devices suffer from several drawbacks, including a lack of preventing the tie wrap from continuing to be pushed ahead making the loop smaller and the inability of easily releasing the tie wrap connection.

Accordingly, there are many instances where it would be economical and more efficient to have a tie wrap design that could be used repeatedly, such that a specific sizing of the enclosure could be achieved and then the tie wrap could be used, removed and reused again and again, preferably maintaining the same enclosure sizing.

SUMMARY

The present invention features a reusable connecting device, said reusable connecting device comprising: a strap with a length, wherein said strap includes a first end and a second end; a housing with an opening, wherein said first end of said strap is configured to engage with an inner surface of said opening of said housing; a cover, coupled to said housing, wherein said cover is configured to cover one side of said opening of said housing; and an attachment mechanism, fixably coupled to said housing, wherein said attachment mechanism features a first portion and a second portion, wherein said first portion and said second portion of said attachment mechanism are configured to be connected, disconnected and reconnected to one another.

The reusable connecting device comprises a strap having a length, wherein the strap includes a first end and a second end and a first side and a second side, at least a portion of the first side proximate the first end includes a plurality of engagement elements; and a housing with an opening disposed proximate the second end, the opening including a strap engagement region, wherein the plurality of engagement elements disposed on the first side of the strap proximate the first end are configured to engage with the strap engagement region of the opening of the housing, the housing further including a cover, coupled to the housing, wherein the cover is configured to cover one side of the opening of the housing.

The second end may include a reusable coupling mechanism, the reusable coupling mechanism fixably coupled to the housing, wherein the reusable coupling mechanism of a first reusable connecting device is configured to be connected, disconnected and reconnected to a reusable coupling mechanism disposed on a second end of another reusable connecting device.

The reusable coupling mechanism may be selected from the group of coupling mechanisms consisting of a male coupling mechanism and a female coupling mechanism. The first reusable connecting device strap may include a second end with a male reusable coupling mechanism and wherein a second reusable connecting device strap includes a second and with a female reusable coupling mechanism. The male and female coupling mechanisms may be side engaging coupling mechanisms. The male and female coupling mechanisms may be top engaging coupling mechanisms.

A further embodiment of the present invention features a reusable connecting device that comprises a strap having a length, wherein the strap includes a first end and a second end and a first side and a second side, wherein at least one of the first side and the second side includes a plurality of engagement elements and either a first end or a second end includes a first component of a two part coupling device that is configured to engage with a second component of the two part coupling device located on the other end. The second component of the two part coupling device is separate from said first strap portion, and comprises a housing with an opening having an engagement feature disposed within its inner surface, wherein the housing is configured to engage with the plurality of engagement elements located on at least part the first side or second side of said strap portion of the first component of the two part coupling device. The housing may optionally include a cover coupled to the housing, wherein the cover is configured to cover one side of the opening of the housing. The strap of the first component of the two part coupling device may be optionally adjustable or fixed in length when engaged with the housing; as determined by the number of engagement elements and total length of the surface which they cover on either a first or second side of the strap portion of the first component of the two part coupling device.

For example, a first strap portion of the two part coupling device having a fixed length may include a short series of engagement elements sufficient in number to adequately engage the engagement feature on the inner surface of the housing located on the second component of the two part coupling device such that the strap can be engaged, but then stops due to lack of further engagement elements. The non-adjustable strap may further include a flange or enlargement just proximal to the engagement elements on the strap to further ensure that the strap cannot be pushed further into the housing.

An adjustable version or embodiment may include a greater number of engagement elements situated along the length of the strap such that it can be pushed further into the housing to obtain a desired diameter. The reusable connecting device may optionally be attached or tethered to another cable tie or other anchoring device such as a loop, hook, or pin at either of its two components so it can be conveniently secured to another object for repeated use.

A further embodiment of the present invention features a reusable connecting device that comprises a non-adjustable strap, wherein the non-adjustable strap includes a first end with a first portion of a connection mechanism and a second end with a second portion of the connection mechanism, wherein the first portion and the second portion are configured to engage and disengage with one another. The non-adjustable strap may be connected by a coupling member to another strap having a length, wherein the strap includes a first end and a second end and a first side and a second side, wherein at least one of the first side and the second side includes a plurality of engagement elements that are configured to engage with an opening located on either the first end or the second end of the strap.

Optionally, the non-adjustable connecting device may be coupled with another anchoring device such as a loop, hook, or push pin so it can be conveniently secured to another object for repeated use. For example, the non-adjustable connecting device coupled with a loop may be placed over the mouth of a water bottle so the non-adjustable connecting device can be used to carry the bottle or conveniently attach it to another object. Likewise, the non-adjustable connecting device attached to a push pin may be used in the automotive industry to connect it to pre-drilled holes in various parts and can be used to hold wires, etc.

It is important to note that the present invention is not intended to be limited to a system or method which must satisfy one or more of any stated objects or features of the invention. It is also important to note that the present invention is not limited to the preferred, exemplary, or primary embodiment(s) described herein. Modifications and substitutions by one of ordinary skill in the art are considered to be within the scope of the present invention.

BRIEF DESCRIPTION OF THE DRAWINGS

These and other features and advantages of the present invention will be better understood by reading the following detailed description, taken together with the drawings wherein:

FIG. 1 is a detailed view of the reusable tie wrap of one embodiment of the present invention;

FIG. 8A is detailed view of a non-adjustable buckle strap according to one embodiment of the invention connected to a loop, which can be placed over the mouth of a bottle, or used to secure it to another object with a screw etc. depending on the diameter of the loop;

FIG. 8B is a detailed view of a non-adjustable buckle strap according to one embodiment of the invention connected to a pin type fastener device such as those used by the automotive industry wherein the pin can be pushed into a pre-drilled hole to secure the buckle strap to an object or auto part to hold wire bundles etc.;

DETAILED DESCRIPTION OF THE PREFERRED EMBODIMENTS

Figure 2A:
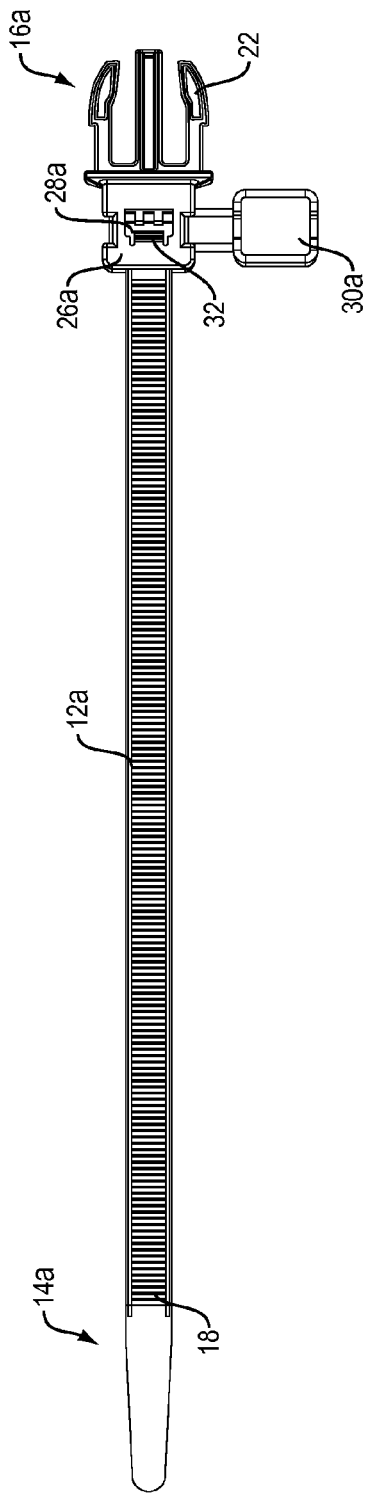
FIGS. 2A and 2B are a detailed view of the reusable tie wrap of one embodiment of the present invention.

The present invention, FIG. 1, features a reusable connecting device or tie wrap 10 that includes a strap 12 of any length with a first end 14 and a second end 16. The first end 14 of the strap 12 includes one or more engagement elements in the form of notches or teeth 18. The second end 16 of the strap 12 features an attachment mechanism 20. The attachment mechanism 20 is preferably a two part plastic molded buckle or side release plastic molded buckle, with a first portion 22 and a second portion 24. The second end 16 of the strap 12 is fixably coupled to either the first portion 22 or the second portion 24.

For example, the second end of the strap may be connected to the first portion 22 of the two-part attachment mechanism 20. The first portion 22 is configured to removably or releasably attach to the second portion 24 of the attachment mechanism 20. The second portion 24 of the attachment mechanism 20 may also features a housing 26. The housing 26 includes an opening 28, which is configured to accept the first end 14 of the strap 12.

The strap, attachment mechanism and housing are all preferably constructed from a plastic or other similar composite material. However, it is contemplated that the entire reusable tie wrap or portions of the reusable tie wrap may be made from any other material, such as metal. In addition, although the attachment mechanism 20 is shown as a side release mechanism, this is for illustrative purposes only and is not a limitation of the present invention as any and all other releasable attachment mechanisms/buckles are considered to be within the scope of the present invention.

Figure 10:
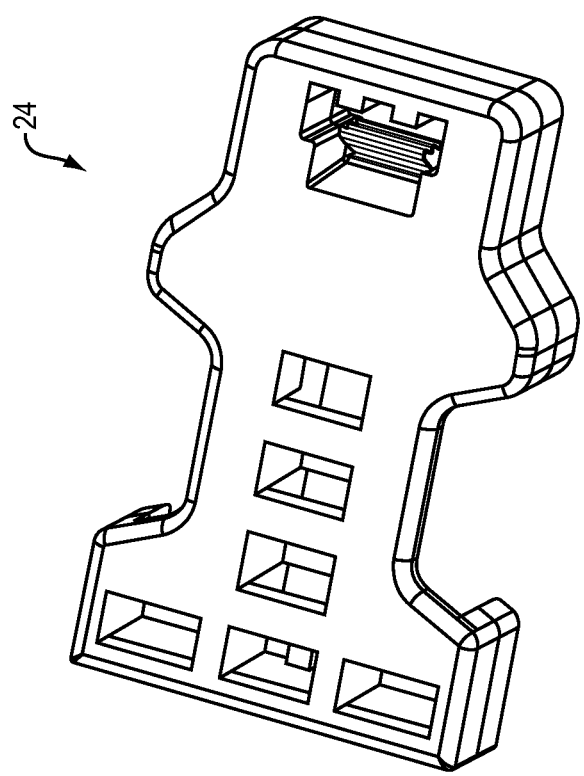
FIG. 10 is a detailed view of another embodiment of the second portion of the two-part attachment of the invention manufactured in a two-part mold process.

In another and preferred embodiment shown in FIG. 10, the second portion 24 of the attachment mechanism 20 can be produced in a two-part mold eliminating any actions in the mold itself. This design and molding technique will greatly simplify production of all the designs shown, as they can all be produced in two-part molds, and many of the designs can be produced as complete parts requiring no assembly.

In use, the strap is looped around an object, and the first end 14 of the strap 12 is secured through the opening 28 in the housing 26 and pulled through until a desired length or a desired tightness is reached, thereby creating a loop or enclosure area (secured around an object). The teeth or engagement elements 18 on the first end 14 are configured to engage with an inner surface or element 32 located in the opening 28 and allow the strap 12 to pass through the opening 28, but not to move backward through the opening 28. After the strap is adjusted to a desired length, a user can cut off the portion of the first end 14 of the strap 12 that has passed through the opening 28. A cap or cover 30 can then be closed down over the cut portion of the first end 14 of the strap 12. The cover 30 engages with the housing 26 and blocks access to the cut portion of the first end 14 of the strap 12. The cover 30 serves two purposes. First, the cover 30 protects users from any sharp edges that remain once the strap 12 is cut. Second, the cover 30 prevents the strap 12 from moving any further forward through the opening 28, thereby ensuring that the enclosure area created is maintained at the exact desired length or tightness, such that the first end 14 of the strap 12 cannot move further through the opening 28. As shown in FIG. 1, the first end 14 of the strap 12 is designed to come up through the back side of the opening; however this is not intended to be a limitation of the present invention. It is contemplated and within the scope of the present invention that the opening may be located at a different angle or location.

The object contained by the reusable tie wrap may be, for example, a group of cords, wherein a user can wrap the strap around the cords and secure them tightly with the reusable tie wrap 10. The user can then open or disconnect the attachment mechanism 20 to remove the tie wrap, and then close or reconnect the attachment mechanism 20 back around the group of cords. Alternatively, the object may be two door handles on cabinets. The user can secure two door handles by looping the strap through both door handles and using the reusable tie wrap 10 to securely create a desired length that forms a tight fit around the handles. The user will then be able to remove the tie wrap 10 from the handles using the attachment mechanism 20 and replace the tie wrap 10 around the handles with the attachment mechanism 20. Multiple other uses are contemplated and within the scope of the present invention.

Figure 2B:
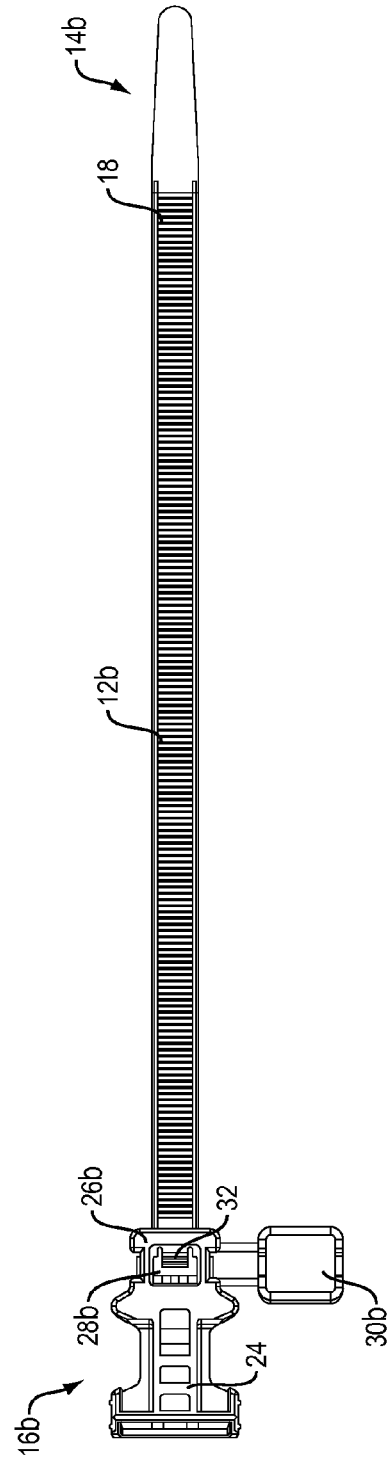

The reusable tie wrap as shown in FIG. 1 may be utilized alone (individually) while the embodiment shown in FIGS. 2A and 2B are used as a pair of straps wherein a first strap 12a has a second end 16a and male connector element 22 having, in the disclosed embodiment, two (2) barbs, whereas the second strap 12b has a second end 16b that is design and configured to releasably attach to a corresponding male end 16a. In this embodiment, the first strap 12a is fixably coupled to a first housing 26a, which is located on the second end 16a of the first strap 12a. The first housing 26a is fixably coupled to a first portion 22 of an attachment mechanism 20. The second strap 12b is fixably coupled to a second housing 26b, which is located on the second end 16b of the second strap 12b. The second housing 26b is fixably coupled to a second portion 24 of the attachment mechanism 20. The first end 14a of the first strap 12a is configured to enter the first housing 26a. The first end 14b of the second strap 12b is configured to enter the second housing 26b. As such, the first portion 22 of the attachment mechanism 20 located on the first strap 12a is configured to engage with the second portion 24 of the attachment mechanism 20 located on the second strap 12b.

As previously discussed, a plurality of teeth or engagement elements 18 are located on a first side of the straps 12a/12b at least proximate the first ends 14a/14b of the straps 12a/12b and these teeth 18 are configured to interconnect with an inner surface or element 32 in the opening 28 of the housing 26a/26b and allow the strap 12a/12b to move forward through the opening 28, but not to move backward. A user can adjust the exact length of the straps 12a/12b as needed and then cut the first ends 14a/14b of the straps 12a/12b and close the respective covers 30a/30b thereby preventing the straps from moving any further through the opening and becoming any smaller. The cover 30 also covers any sharp area of the cut strap. Once the two straps 12a/12b are at a desired length, the attachment mechanism can be connected and disconnected as desired by the user.

Figure 3:
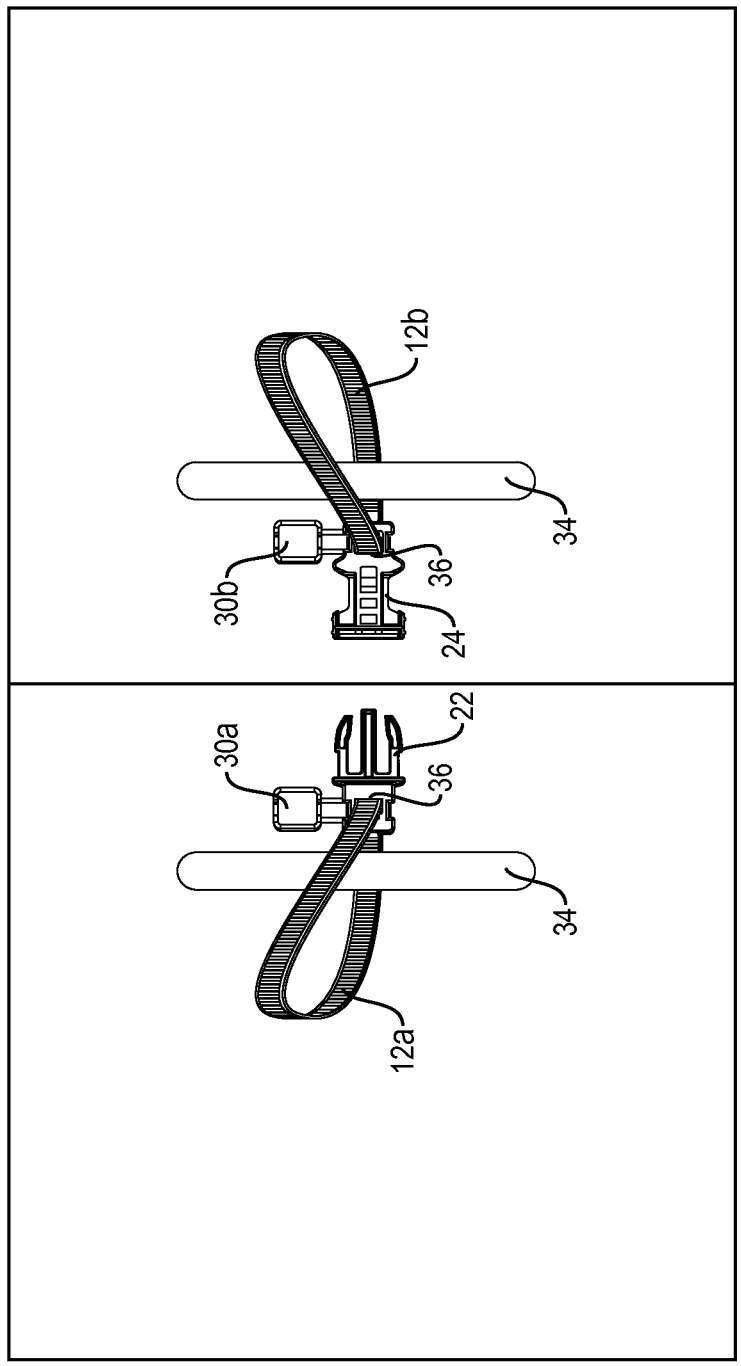
FIG. 3 is a detailed view of two of the reusable tie wraps of one embodiment of the present invention in use on a cabinet door to "child proof" the cabinet door.
Figure 4:
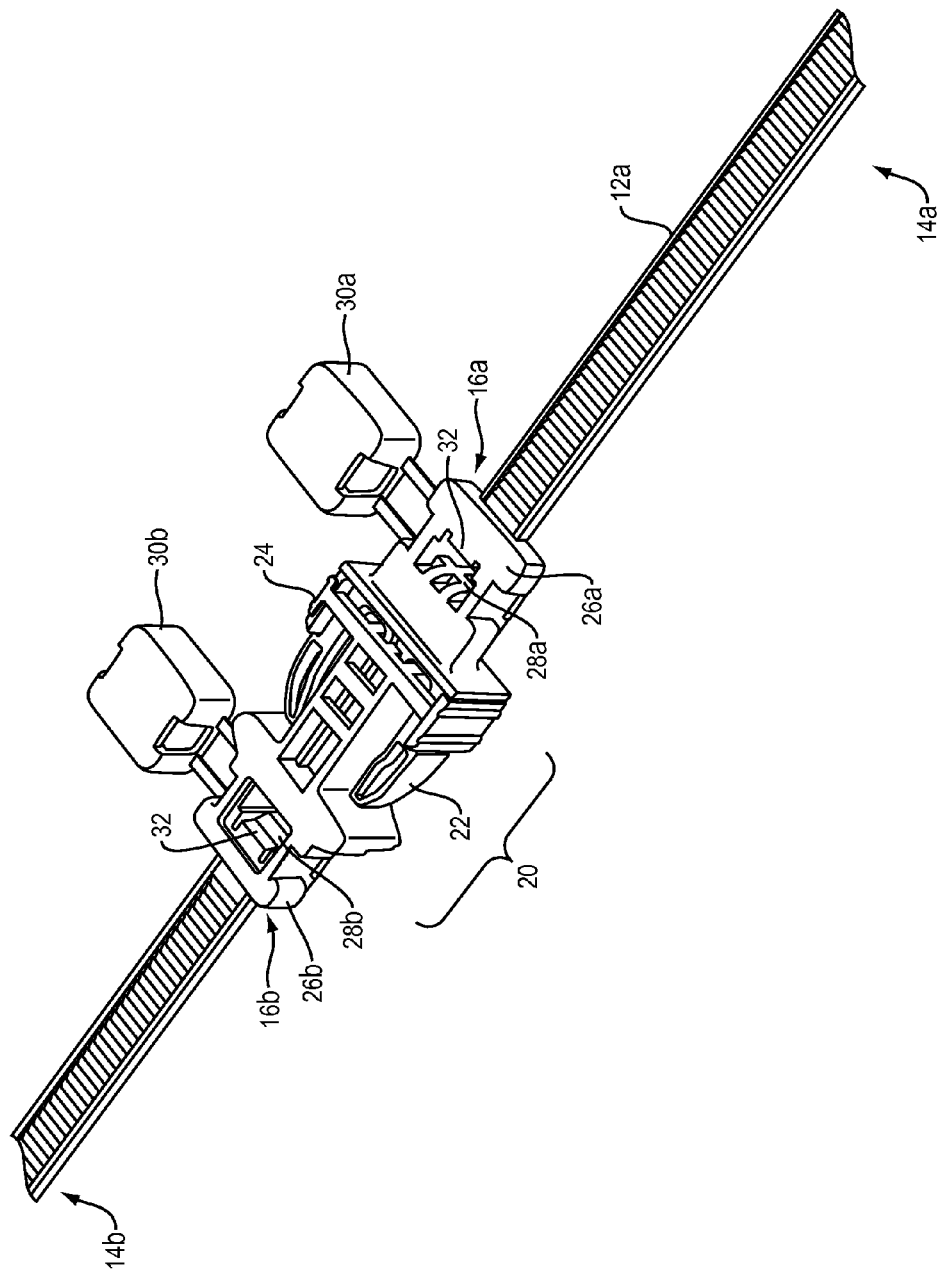
FIG. 4 is a detailed view of the attachment mechanism of the reusable tie wrap of one embodiment of the present invention used to attach two ends of the two tie wraps as illustrated in FIG. 3.

An example of a use of the two strap design would be a side-by-side cabinet, FIG. 3, wherein each cabinet features a handle 34 and wherein the two handles are in close proximity to one another and generally parallel to one another. A user would first tighten the first strap 12a to one of the handles 34 by securing the first end 14a of the first strap 12a through the first housing 26a. Then the user would tighten the second strap 12b to the other handle 34 by securing the first end 14b of the second strap 12b through the second housing 26b. Once both sides are tightened, the user can cut the first ends of the straps (the portion protruding through the housing) and then close the respective covers 30a/30b, thereby preventing the straps 12a/12b from becoming any tighter and protecting fingers from any sharp edges caused by the cutting of the straps. The straps 12a/12b are shown in FIG. 3 just prior to closing the covers 30a/30b. The cut portion 36 of the straps 12a/12b is shown in the opening 28 of the housing 26. The attachment mechanism can then be disengaged (as shown in FIG. 3) allowing the two cabinet doors to be opened or the attachment mechanism can be engaged as shown in FIG. 4 to secure the straps together preventing the cabinet doors from opening all without removing the straps. The reusable tie wrap design is effective at preventing children from opening the cabinet. In this configuration, each strap is a one-time use, such that once connected to the handle, the only way to remove the strap is to cut the strap. However, the use of two straps together with the attachment mechanism enables the reusable tie wrap pair to be used multiple times. Other configurations and uses are contemplated and within the scope of the present invention.

Figure 5:
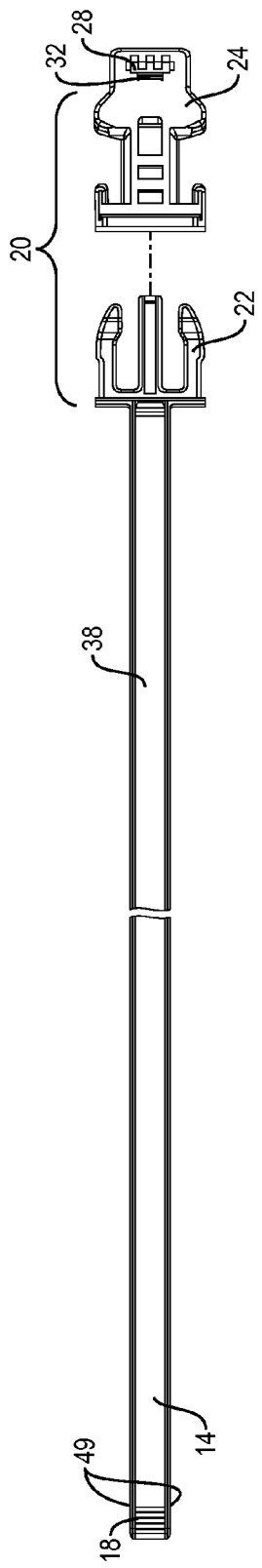
FIG. 5 is a detailed view of the reusable and length selectable tie wrap of one embodiment of the present invention.

In another embodiment of the present invention, FIG. 5, the attachment mechanism 20 includes the first end portion 22 and second end portion 24, where the first portion 22 is attached to a non-adjustable strap 38. The non-adjustable strap 38 is preferably configured to be a predetermined length that is not adjustable. The non-adjustable strap 38 may come in any variety of lengths and may be constructed from a composite material such as a plastic or from a similar material. The non-adjustable strap 38 includes a short series of teeth or notches 18 on the first end 14 that engage with element 32 located in opening 28 of the second portion 24.

After the strap end 14 has been pushed into the slot 28 sufficiently as to engage the teeth 18 with the engagement feature 32, the strap may be prevented from moving further into the slot 28 by a stop feature such as but not limited to an enlargement, barb or flange 49 on the sides (for example) of the first end 14 of the strap 38 just proximal to the teeth 18. In this configuration, a cover 30 may be used, but is not necessary as the end of the strap 14 is prevented from extending out the opposite side of the opening 28 by the stopping feature 49. In this configuration, the strap 38 cannot be pushed further forward, or pulled back out after the teeth 18 have engaged the inner surface 32 of slot 28.

Figure 6:
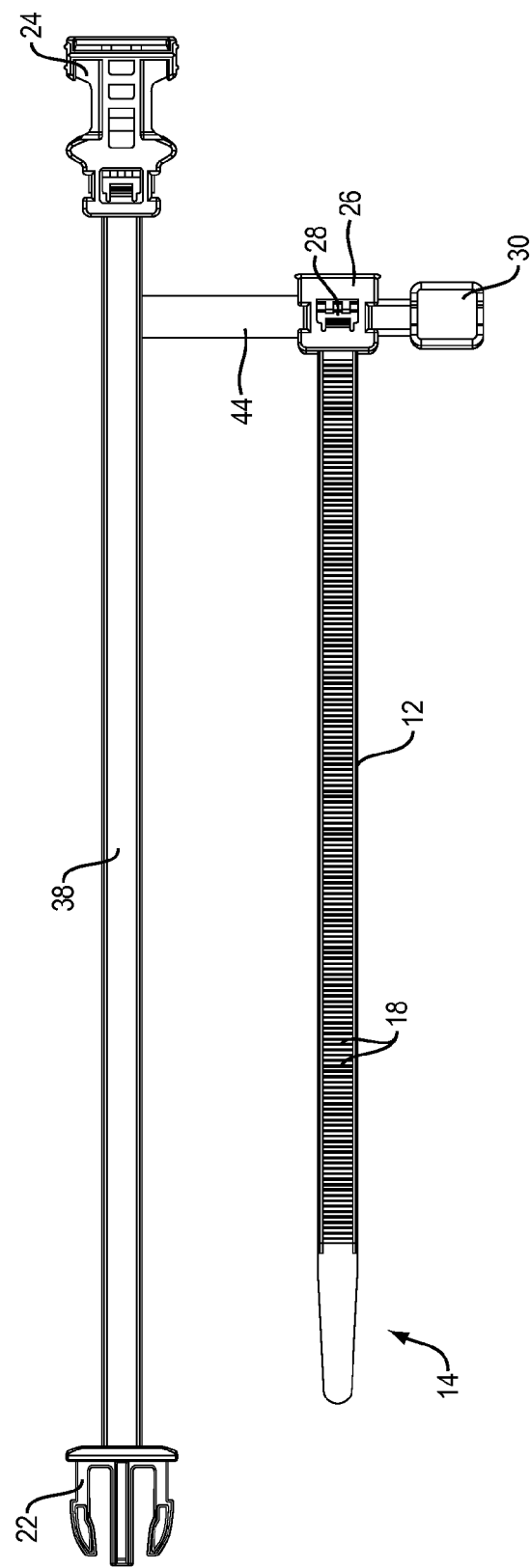
FIG. 6 is a detailed view of a tie wrap attached to a buckle strap according to one embodiment of the present invention.

In a further embodiment of the present invention, FIG. 6, a non-adjustable strap 38 is connected on a one end to a first portion 22 of an attachment mechanism 20 and on an opposite end to a second portion 24 of the attachment mechanism 20. However, a two-part fixed length strap 38 such as that shown in FIG. 5 may also be used. The non-adjustable strap 38 is connected to a tie wrap strap 12 with a coupling member 44. The coupling member 44 may be of the same material as either the non-adjustable strap 38 or the strap 12 or of another material. For example, the strap 12 may be molded to the non-adjustable strap 38. The tie wrap strap 12 features a plurality of notches or teeth 18 along the length of the strap 12. The notches/teeth 18 are configured to pass through the opening 28 of the housing 26, but to not allow the strap 12 to move back through the opening 28 once the first notch/tooth has passed through the opening, as is well known with tie wraps sometimes referred to as cable ties. The strap 12 may also include a cap or cover 30, as previously discussed, to prevent the first end 14 of the strap 12 from moving further through the opening 28 once a desired position is obtained.

Figure 7:
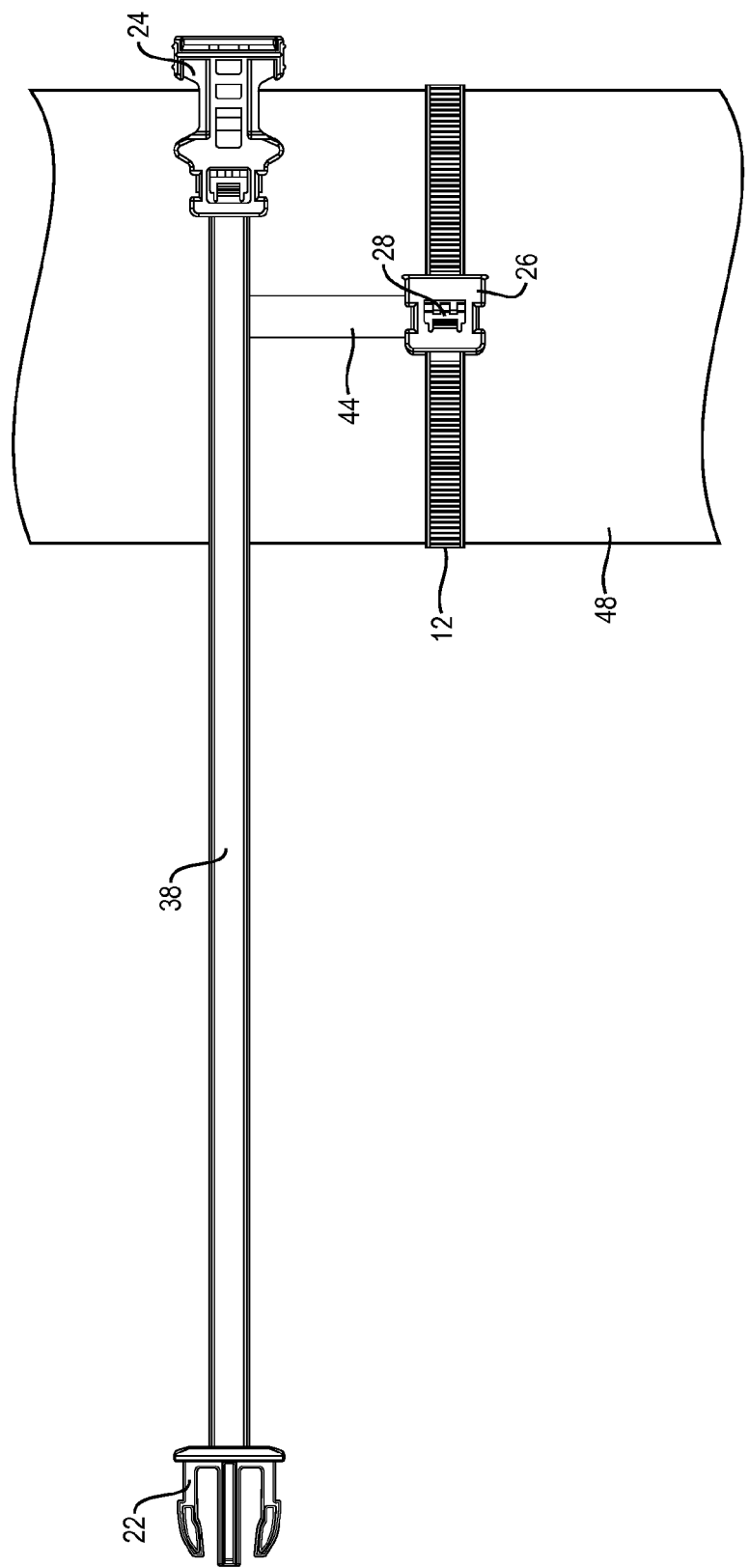
FIG. 7 is a detailed view of the tie wrap attached to a buckle strap, which is shown with the tie wrap attached to a hose or cord, according to one embodiment of the present invention.

FIG. 7 details the embodiment described in FIG. 6 when in use around a cord or hose 48. The reusable tie wrap device can be used to gather a hose or cord 48, such as into a wrapped position, or to group multiple hoses or cords together, and allow the device to be used multiple times. As shown, the strap 12 is securely fastened around the hose or cord 12 such that the strap 12 is not removable unless a user cuts or otherwise removes the strap 12. The tie wrap strap 12 serves to maintain the reusable tie wrap device generally permanently attached to 1 end or one segment of the object (such as hose or cord 48) that the user wishes to at some point bundle or hold together. This tie wrap strap 12 keeps the reusable tie wrap device in close proximity to the hose, cord or other device on which it is to be used. The non-adjustable strap 38 and attachment mechanism 20 (first and second portion 22/24) can be wrapped around the hose or cord 48 and connected to one another, thereby securing the hose or cord 48 in a desired configuration.

For example, the strap 12 can be secured around a garden hose and then the non-adjustable strap 38 can be used to surround multiple passes of the garden hose thereby keeping the hose in a wrapped-up or coiled configuration. The attachment mechanism 20 can lock the garden hose in place and then be opened to uncoil the garden hose as needed. In another example, the strap 12 can be secured around a single computer cable and then the non-adjustable strap 38 can be used to surround multiple computer cables, thereby organizing the cables into a bundle, which can be easily connected or separated by use of the connection mechanism.

Figure 9A:
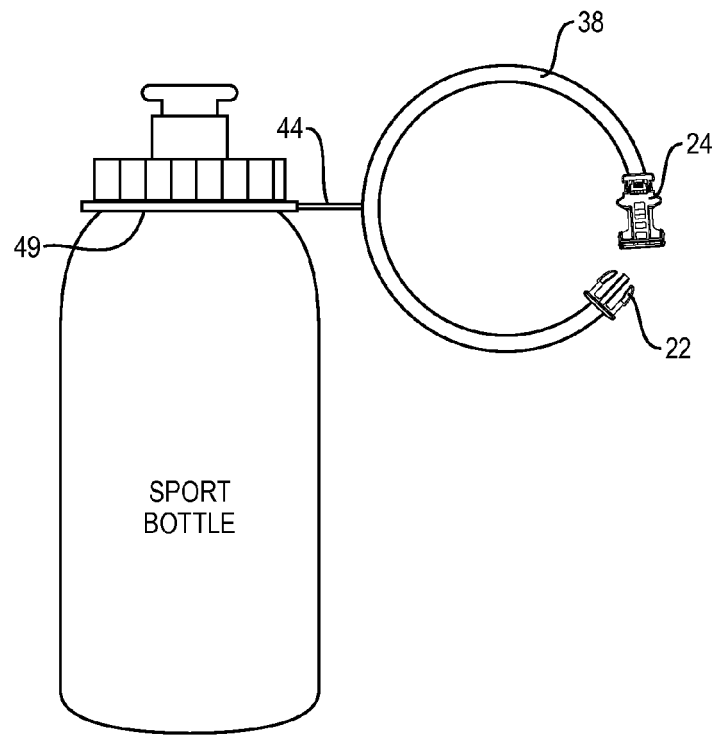
FIG. 9A is a detailed view of the tie wrap described in FIG. 8A in use connected to a water bottle.

FIG. 8A illustrates one use for the embodiment described in FIG. 6 wherein the non-adjustable strap is connected on a one end to a first portion 22 of an attachment mechanism 20 and on an opposite end to a second portion 24 of the attachment mechanism 20. In this example, the non-adjustable strap 38 is connected to an open loop 49 with a coupling member 44. This configuration allows the buckle strap to be placed around the opening of a bottle as described in FIG. 9A so that the bottle can easily be carried or conveniently attached to different objects. Alternatively the loop 49 can be sized to accept a small screw for attaching it to other objects.

Figure 9B:
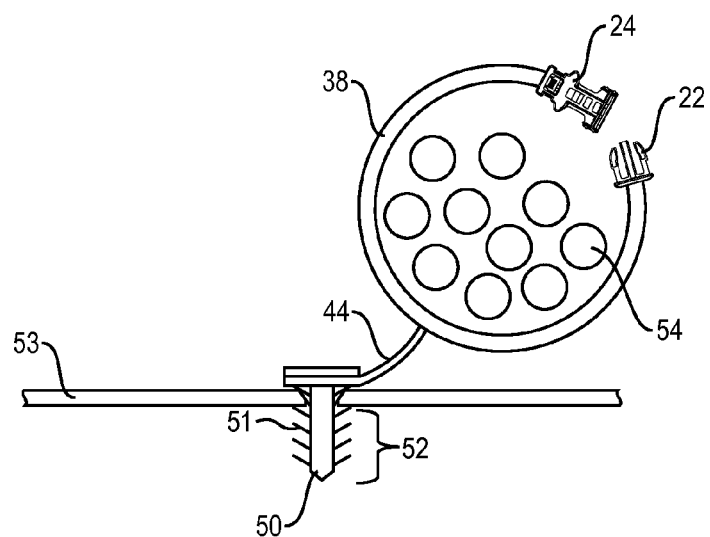
FIG. 9B is a detailed view of tie wrap shown in FIG. 8B in use connected to a pre-drilled hole and holding wires.

FIG. 8B details another embodiment described in connection with FIG. 6 wherein the non-adjustable strap 38 is connected on a one end to a first portion 22 of an attachment mechanism 20 and on an opposite end to a second portion 24 of the attachment mechanism 20. However, in this example, the non-adjustable strap 38 is connected via coupling member 44 to a push pin 50 containing one way barbs 52 such as those commonly used in the automotive industry. This configuration allows the buckle strap to be attached to pre-drilled holes 51 in parts as shown in FIG. 9B. This configuration allows the buckle strap to be permanently attached to a part 53 by simply pushing the pin into a hole. The releasable buckle strap can then be used to removably secure wires and hoses 54.

Although FIGS. 6, 7 and 8 describe a generally non-adjustable buckle strap connected to multiple mounting devices such as a standard cable tie, loop, and push pin, the non-adjustable buckle strap may be substituted for an adjustable or two part version as described in FIGS. 1 through 5 herein.

Accordingly, the present invention provides a novel reusable connecting device, which allows a user the convenience of a wrap tie that is also reusable.

Modifications and substitutions by one of ordinary skill in the art are considered to be within the scope of the present invention, which is not to be limited except by the allowed claims and their legal equivalents.

The invention claimed is:

1. A disconnectable connecting device comprising:
a second coupling mechanism;
a first connecting device, wherein said first connecting device comprises a flexible strap having a length extending in a longitudinal direction, wherein said strap includes a first end and a second end and a first side and a second side, wherein at least one of said first side and said second side proximate said first end includes a plurality of engagement elements that are configured to engage with a corresponding engagement opening disposed in said second coupling mechanism, said first connecting device further including a first coupling mechanism disposed on said second end of said strap, said first coupling mechanism configured for being removably connected with said second coupling mechanism for forming a disconnectable connecting device;
wherein one of said first and second coupling mechanisms comprises a male connecting mechanism and the other of said first and second coupling mechanism comprises a female connecting mechanism;
said male connecting mechanism comprising a central, fixed protrusion extending co-axially with said longitudinal direction of said flexible strap and configured for engaging in a corresponding central channel in said female connecting mechanism, and first and second flexible coupling members extending co-axially with said longitudinal direction of said flexible strap length, each of said first and second flexible coupling members disposed on opposite sides of said central, fixed protrusion and having an inner surface confronting said central fixed protrusion and an outer surface opposite said inner surface, said outer surface of each of said first and second flexible coupling members including an engagement shoulder, configured for engaging with a corresponding engagement shoulder in said female connecting mechanism, each of said first and second flexible coupling members flexible in a direction transverse to said longitudinal direction of said strap length when depressed without the use of a tool urging said first and second flexible coupling members toward said central fixed protrusion of said male connecting mechanism; and
said female connecting mechanism including first and second flexible coupling member engagement regions disposed on opposite sides of said female connecting mechanism central channel, each of said first and second flexible coupling member engagement regions including an opening configured for receiving one of said first and second flexible coupling members and for providing access to said first and second flexible coupling members once inserted into said first and second flexible coupling member engagement regions without the use of, said first and second flexible coupling member engagement regions further including an engagement shoulder, configured for engaging with a corresponding engagement shoulder of one of said first and second flexible coupling member engagement shoulders of said first and second flexible coupling members of said male connecting mechanism when said male connecting mechanism is inserted in a first direction linearly co-axially with said longitudinal direction of said flexible strap into said female connecting mechanism, and configured for linearly co-axially with said longitudinal direction of said flexible strap disengaging from said female connecting mechanism in a second direction opposite said first direction when both said first and second flexible coupling members of said male connecting mechanism are urged inward toward said central, fixed protrusion of said male connecting mechanism.

2. The disconnectable connecting device of claim 1, wherein, wherein said second coupling mechanism disposed on said second end of said first connecting device includes a cover, fixedly coupled to said second coupling mechanism, wherein said cover is configured to move from an open position to a closed position, wherein in said closed position, said cover is configured to cover one side of said engagement opening of said second coupling mechanism.

3. A system for releasably securing two objects in close proximity utilizing first and second connecting devices, said system comprising:

a first connecting device, said first connecting device comprising a strap having a length extending in a longitudinal direction, wherein said strap includes a first end and a second end and a first side and a second side, wherein at least one of said first side and said second side proximate said first end includes a plurality of engagement elements that are configured to engage with a corresponding engagement opening disposed in a coupling mechanism disposed on said second end of said strap of said first connecting device, for securing said first connecting device to a first object;

a second connecting device, said second connecting device comprising a strap having a length extending in a longitudinal direction, wherein said strap includes a first end and a second end and a first side and a second side, wherein at least one of said first side and said second side proximate said first end includes a plurality of engagement elements that are configured to engage with a corresponding engagement opening disposed in a coupling mechanism disposed on said second end of said strap of said second connecting device, for securing said second connecting device to a second object;

wherein said coupling mechanism disposed on said second end of said strap of said first connecting device includes a male coupling mechanism, and wherein said coupling mechanism disposed on said second end of said strap of said second connecting device includes a female coupling mechanism, said male and female coupling mechanisms configured for being releasably coupled and uncoupled such that in said coupled configuration, said first and second objects are held in a generally fixed relationship and wherein in said uncoupled configuration, said first and second objects are held in a generally non-fixed relationship;

said male coupling mechanism comprising a central, fixed protrusion extending co-axially with said longitudinal direction of said flexible strap and configured for engaging in a corresponding central channel in said female coupling mechanism, and first and second flexible coupling members extending co-axially with said longitudinal direction of said flexible strap length, each of said first and second flexible coupling members disposed on opposite sides of said central, fixed protrusion and having an inner surface confronting said central fixed protrusion and an outer surface opposite said inner surface, said outer surface of each of said first and second flexible coupling members including an engagement shoulder, configured for engaging with a corresponding engagement shoulder in said female coupling mechanism, each of said first and second flexible coupling members flexible in a direction transverse to said longitudinal direction of said strap length when depressed without the use of a tool urging said first and second flexible coupling members toward said central fixed protrusion of said male coupling mechanism; and said female coupling mechanism including first and second flexible coupling member engagement regions disposed on opposite sides of said female coupling mechanism central channel, each of said first and second flexible coupling member engagement regions including an opening configured for receiving one of said first and second flexible coupling members and for providing access to said first and second flexible coupling members once inserted into said first and second flexible coupling member engagement regions without the use of, said first and second flexible coupling member engagement regions further including an engagement shoulder, configured for engaging with a corresponding engagement shoulder of one of said first and second flexible coupling member engagement shoulders of said first and second flexible coupling members of said male coupling mechanism when said male coupling mechanism is inserted in a first direction linearly co-axially with said longitudinal direction of said flexible strap into said female coupling mechanism, and configured for linearly co-axially with said longitudinal direction of said flexible strap disengaging from said female coupling mechanism in a second direction opposite said first direction when both said first and second flexible coupling members of said male coupling mechanism are urged inward toward said central, fixed protrusion of said male coupling mechanism.

4. The system of claim 3, wherein each of said first and second coupling mechanisms disposed on said second ends of said first and second connecting devices each include a cover, fixedly coupled to said respective first and second coupling mechanisms, wherein said cover is configured to move from an open position to a closed position, wherein in said closed position, said cover is configured to cover one side of said engagement opening of said first and second coupling mechanism.

* * * * *